United States Patent
Tsuruki

(10) Patent No.: US 11,520,089 B2
(45) Date of Patent: Dec. 6, 2022

(54) DIFFRACTIVE OPTICAL ELEMENT, OPTICAL APPARATUS, IMAGING APPARATUS AND DIFFRACTIVE OPTICAL ELEMENT MANUFACTURING METHOD

(71) Applicant: CANON KABUSHIKI KAISHA, Tokyo (JP)

(72) Inventor: Yuuta Tsuruki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 16/830,510

(22) Filed: Mar. 26, 2020

(65) Prior Publication Data
US 2020/0310011 A1 Oct. 1, 2020

(30) Foreign Application Priority Data
Apr. 1, 2019 (JP) .............................. JP2019-070127

(51) Int. Cl.
*G02B 5/18* (2006.01)
(52) U.S. Cl.
CPC ......... *G02B 5/1852* (2013.01); *G02B 5/1857* (2013.01); *G02B 5/1866* (2013.01)
(58) Field of Classification Search
CPC .. G02B 5/1852; G02B 5/1857; G02B 5/1866; G02B 1/04
USPC .......................................... 359/576, 578, 571
See application file for complete search history.

(56) References Cited

U.S. PATENT DOCUMENTS

| | | | |
|---|---|---|---|
| 7,663,803 B2 | 2/2010 | Ukuda et al. | |
| 2005/0219698 A1* | 10/2005 | Tanaka | G02B 5/1852 359/578 |
| 2008/0174871 A1 | 7/2008 | Ukuda et al. | |
| 2011/0273775 A1* | 11/2011 | Sasaki | G02B 5/1852 359/576 |
| 2012/0008209 A1* | 1/2012 | Ushigome | G02B 27/0056 359/569 |
| 2013/0057956 A1* | 3/2013 | Iwasa | G02B 5/1895 428/688 |
| 2013/0235460 A1* | 9/2013 | Iwasa | G02B 5/1876 359/576 |
| 2014/0043687 A1* | 2/2014 | Murata | G02B 5/1895 359/571 |

FOREIGN PATENT DOCUMENTS

JP 2008-203821 A 9/2008

\* cited by examiner

*Primary Examiner* — Audrey Y Chang
(74) *Attorney, Agent, or Firm* — Venable LLP

(57) ABSTRACT

A diffractive optical element comprises a substrate, a first resin layer arranged on the substrate and a second resin layer arranged on the first resin layer. Each of the first resin layer and the second resin layer includes a grating section, or a layer portion, for forming a diffraction grating and a base section, or another layer portion, held in contact with the grating section. Either the first resin layer or the second resin layer has a lower transmittance portion in the base section thereof that shows an internal transmittance relative to a wavelength of 400 nm which is lower than that of the grating section of the resin layer by not less than 2% and not more than 6%.

11 Claims, 5 Drawing Sheets

DIFFRACTIVE OPTICAL ELEMENT, OPTICAL APPARATUS, IMAGING APPARATUS AND DIFFRACTIVE OPTICAL ELEMENT MANUFACTURING METHOD

BACKGROUND OF THE INVENTION

Field of the Invention

The present invention relates to a diffractive optical element to be used in an optical apparatus such as a camera or a video camera.

Description of the Related Art

Known optical elements to be used for lenses and other optical items include diffractive optical elements (DOEs) that are formed by using two resin materials having different optical characteristics. When employed as lenses, diffractive optical elements can minimize chromatic aberration because chromatic aberration appears completely oppositely between the diffractive optical system and the refractive optical system of the element, in other words the diffraction optical system can counter the chromatic aberration of the refractive optical system. Additionally, diffraction optical systems can provide a significant downsizing and weight saving effect. Furthermore, as a result of technological advancement in the field of optical apparatus including cameras and video cameras, the quality of images that such optical apparatus produces has remarkably been improved in recent years and, accordingly, lenses to be used for such optical apparatus are expected to satisfy evermore rigorous requirements in terms of minimization of chromatic aberration. To meet such rigorous requirements, diffractive optical elements need to achieve a high diffraction efficiency over the entire visible light wavelength range (in the wavelength range between 400 nm and 700 nm of rays of visible light).

For instance, Japanese Patent Application Laid-Open No. 2008-203821 discloses a diffractive optical element showing a high diffraction efficiency over the entire visible light wavelength range that is formed by sequentially arranging a first resin layer having a diffraction grating shape and made of a high diffraction and low dispersion resin material and a second resin layer also having a diffraction grating shape and made of a low diffraction and high dispersion resin material on a substrate. Note that the diffraction grating shape is of the relief type having a plurality of concentric rings.

However, the high diffraction and low dispersion resin material and the low diffraction and high dispersion resin material that are employed for a diffractive optical element disclosed in Japanese Patent Application Laid-Open No. 2008-203821 are resin materials in which nanoscale inorganic particles are dispersed and such resin materials tend to scatter light to a large extent by the dispersed nanoscale inorganic particles they contain. Generally, when nanoscale particles smaller than the wavelength range of light exist, visible light is affected and scattered more greatly on the short wavelength side than on the long wavelength side. When a diffractive optical element formed by using a material that scatters visible light in the short wavelength range is employed, blurred images or images whose image quality is significantly degraded can be produced.

SUMMARY OF THE INVENTION

According to the present invention, there is provided a diffractive optical element including: a substrate; a first resin layer arranged on the substrate; and a second resin layer arranged on the first resin layer, wherein the interface of the first resin layer and the second resin layer forms a diffraction grating, and each of the first resin layer and the second resin layer includes a grating section, or a layer portion, for forming the diffraction grating and a base section, or another layer portion, held in contact with the grating section, wherein the base section of at least either the first resin layer or the second resin layer has a lower transmittance portion showing an internal transmittance per 50 µm of thickness relative to the wavelength of 400 nm which is lower than that of the grating section of the resin layer by not less than 2% and not more than 6%.

Further features of the present invention will become apparent from the following description of exemplary embodiments with reference to the attached drawings.

DESCRIPTION OF THE EMBODIMENTS (Diffractive Optical Element)

As described above, a diffractive optical element according to the present invention formed by sequentially laying a substrate, a first resin layer having a diffraction grating shape and a second resin layer also having a diffraction grating shape. Thus, a diffraction grating is formed on the interface of the first resin layer and the second resin layer. Each of the resin layers includes a grating section and a base section that is held in contact with the grating section as viewed in the direction in which the second resin layer is laid on the first resin layer. At least the base section of either the first resin layer or the second resin layer has in itself a lower transmittance portion showing an internal transmittance (to be also referred to simply as transmittance hereinafter) per 50 µm of thickness relative to the wavelength of 400 nm that is lower than the internal transmittance of the grating section of the resin layer by not less than 2% and not more than 6%.

<Element Configuration>

Figure 1:
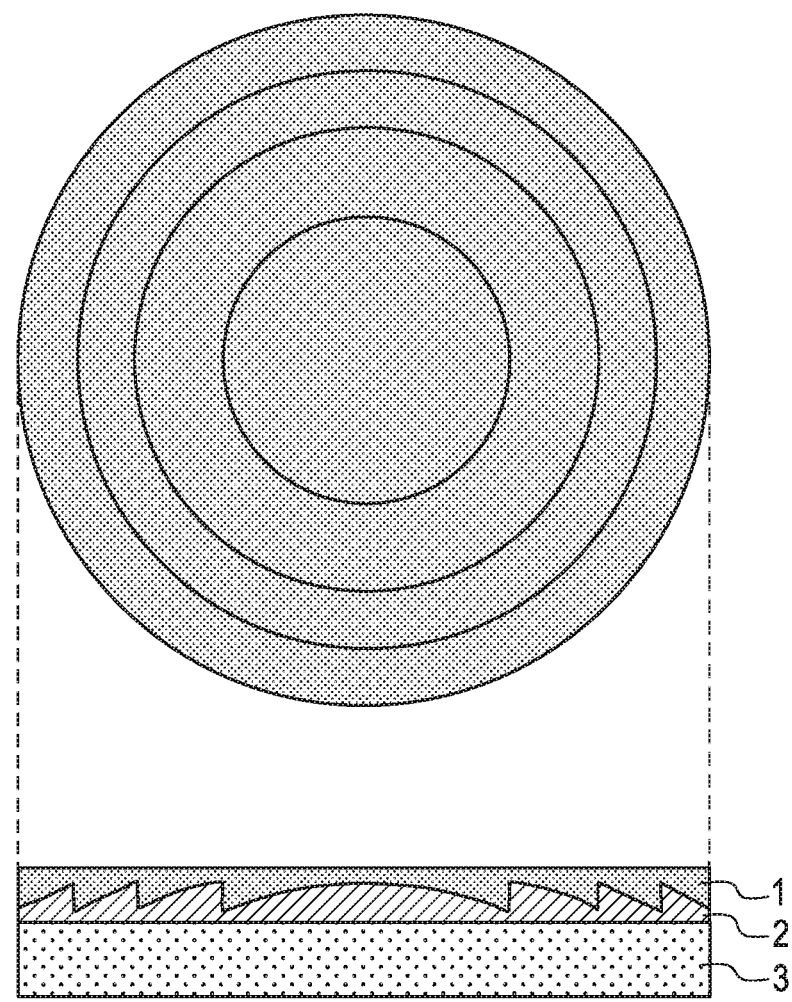
FIG. 1 is a schematic graphic illustration of an embodiment of diffractive optical element according to the present invention.

FIG. 1 is a schematic graphic illustration of an embodiment of diffractive optical element according to the present invention. As shown in FIG. 1, the element comprises a substrate 3, a first resin layer 2 arranged on the substrate 3 and having a plurality of concentric rings and a second resin layer 1 arranged on the first resin layer 2. A transparent glass or plastic material can typically be employed for the substrate 3.

The first resin layer 2 that has a diffraction grating shape and is arranged on the substrate 3 is a low refractive index and high dispersion layer having a low refractive index and a low Abbe number relative to the second resin layer 1. On the other hand, the second resin layer 1 is a high refractive index and low dispersion layer having a high refractive index and a high Abbe number relative to the first resin layer 2. Note that the second resin layer 1 is firmly laid on the first resin layer 2 so as to be tightly held in contact with the latter without any gap between them. Also note that conversely the low refractive index and high dispersion layer may be laid on the high refractive index and low dispersion layer. Additionally, not only the first resin layer but also the second resin layer may be provided with a substrate and the two resin layers that are laminated may be sandwiched between the two substrates. The opposite surfaces of the substrate 3 may be planar, spherical or aspherical.

As described above, the first resin layer 2 shows a diffraction grating shape and the diffraction grating shape is formed by a concentric relief pattern having N (N being an integer not smaller than 2) circles whose center agrees with the center of the element. The arrangement pitch of the concentric circles is greater near the center of the diffractive optical element and gets smaller toward the outer periphery of the element.

In the above-described embodiment of diffractive optical element of the present invention, at least either the first resin layer 2 or the second resin layer 1 of the laminate having the above-described configuration has in the inside thereof a lower transmittance portion, which will be described below.

Figure 2:
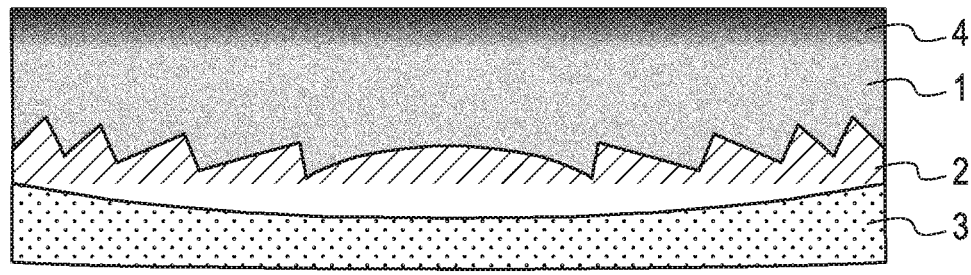
FIG. 2 is a schematic graphic illustration of the lower transmittance portion of a diffractive optical element according to the present invention.
Figure 3:
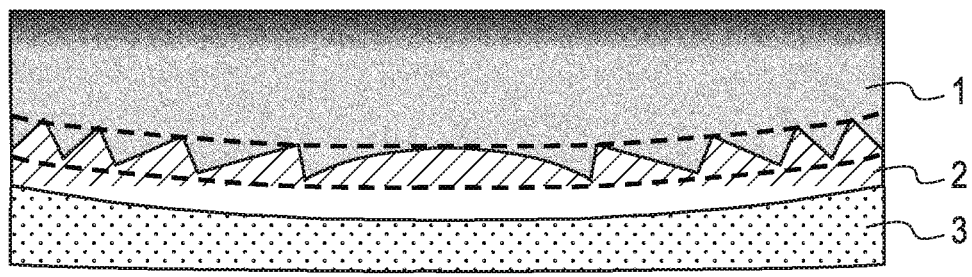
FIG. 3 is a schematic graphic illustration of the base section and the grating section of a diffractive optical element according to the present invention.

FIG. 2 is a schematic graphic illustration of an exemplar diffractive optical element having a lower transmittance portion in the element. The reference numeral 4 (the dark gray part) in the second resin layer 1 denotes the lower transmittance portion. As shown in FIG. 2, the lower transmittance portion 4 does not include any grating section (part where a grating is formed) and exists independently relative to the grating. This is because, if the transmittance of the grating section is reduced, the phase shift of the transmitted wave front that is produced by the grating section becomes large. While the lower transmittance portion 4 is arranged in the second resin layer 1 in FIG. 2, it may alternatively be arranged in a part (the base section) of the first resin layer 2 where no grating is formed. FIG. 3 is a schematic graphic illustration of the base section and the grating section of a diffractive optical element according to the present invention. FIG. 3 is provided for easy understanding of the meaning of the base section and that of the grating section. The lower broken line in FIG. 3 is an imaginary line separating the base section (the part disposed under the broken line) and the grating section (the part disposed on the broken line) of the first resin layer 2. The upper broken line in FIG. 2 is an imaginary line separating the base section (the part disposed on the broken line) and the grating section (the part disposed under the broken line) of the second resin layer 1.

Additionally, the internal transmittance per 50 μm of thickness relative to the wavelength of 400 nm of the element surface including the above-described lower transmittance portion 4 is reduced from the internal transmittance of the remaining part of the resin layer including the lower transmittance section 4 by not less than 2% and not more than 6%. The light scattering of the element in the short wavelength range can be reduced by reducing the transmittance per 50 μm of thickness of the element surface by not less than 2% by way of the provision of the lower transmittance portion. However, on the other hand, when the transmittance of the above-described element surface is reduced by more than 6% relative to the wavelength of 400 nm, the transmittance falls over the entire visible light wavelength range to consequently lower the transmittance of the entire element. The transmittance of the lower transmittance portion 4 is preferably continuously reduced in the direction of the optical axis. In particular, the transmittance is preferably continuously reduced only on the surface and its vicinity that do not include the grating section of the diffractive optical element.

Furthermore, the composition of the lower transmittance portion is preferably the same as the composition of the resin layer that includes the lower transmittance portion. The expression of the same composition as used herein refers to that both the resin material by which the lower transmittance portion is formed and the resin material by which the resin layer that includes the lower transmittance portion commonly possess a repeating unit having the same structure. The use of the same composition both for the lower transmittance portion and the resin layer that includes the lower transmittance portion can prevent unnecessary scattered light from arising on the interface of the lower transmittance portion and the first resin layer or the second resin layer.

<Curable Resin>

While the type of the resin material by which the first resin layer 2 is formed is not subject to any particular limitations, examples of resin materials that can be used for the first resin layer 2 include acrylic resin, vinyl resin and epoxy resin. For the purpose of the present invention, the first resin layer 2 is preferably a low refractive index and high dispersion layer having a low refractive index and a low Abbe number relative to the second resin layer 1. On the other hand, the second resin layer 1 is preferably a high refractive index and low dispersion layer having a high refractive index and a high Abbe number relative to the first resin layer 2. More specifically, when the refractive index of the first resin layer 2 is nd1 and the Abbe number of the first resin layer 2 is ν1, while the refractive index of the second resin layer 1 is nd2 and the Abbe number of the second resin layer 1 is ν2, both the relationship requirement of nd1<nd2 and the relationship requirement of ν1<ν2 are preferably satisfied.

Additionally, to achieve a high diffraction efficiency of not less than 99% over the entire visible light wavelength range, a material whose linear dispersion characteristics include a partial dispersion rate θgF that is smaller than the partial dispersion rate of any comparable ordinary materials is preferably employed as low refractive index and high dispersion material. A technique of dispersing inorganic micro particles in the resin material of the base section and mixing them is known for obtaining such linear dispersion characteristics. Micro particles of titanium oxide, indium tin oxide, zirconium oxide or the like can suitably be used as inorganic micro particles for the purpose of the present invention. The use of a UV-curable resin, an acrylate resin in particular, is preferable for the resin of the base section.

Preferably, the second resin layer 1 contains a resin material and inorganic particles whose average particle diameter is not greater than 10 nm in terms of number average. Inorganic particles that can be used for the purpose of the present invention are particles of at least a substance selected from Al, Zr, Y, Ga, La, oxides and composites of these metals. Preferably, particles of zirconium oxide are preferably employed for the second resin layer 1.

The average particle diameter of the inorganic particles in terms of number average is desirably such that it does not adversely affect the light transmittance, the optical scattering and other optical factors of the element. More specifically, the average particle diameter of the inorganic particles in terms of number average is preferably not less than 1 nm.

The resin material of the second resin layer 1 that operates as dispersion medium for the inorganic particles is a curable resin that is liquid at room temperature and is cured by a radical generation mechanism formed by using a polymerization initiator, which may typically be a photopolymerization initiator or thermal polymerization initiator.

The curable resin that the second resin layer 1 contains may typically be selected from the group consisting of acrylic resins, methacrylic resins, vinyl resins, polyester resins, polyamide resins, urethane resins, epoxy resins and other similar resins, although resins that can be used for the curable resin contained in the second resin layer 1 are not limited to them. Only a single resin material may be used for the curable resin or two or more resin materials may alternatively be used in combination. The use of an acrylic resin or a methacrylic resin is preferable because the reaction speed of photopolymerization with succinic acid mono (2-acryloyloxyethyl) which will be described in greater detail hereinafter, can appropriately be controlled when such a resin is used. A compound that contains an acrylate group or a methacrylate group in the form of monomer, dimer, trimer, oligomer, polymer or a mixture of two or more of them can be used for the acrylic resin or the methacrylic resin that is to be employed as curable resin.

While any compound that contains an acrylate group or a methacrylate group can be used as monomer of an acrylic resin or a methacrylic resin, the use of a compound that contains two or more (meth)acrylate groups is preferable for the purpose of the present invention. Specific examples of compounds that contain two or more (meth)acrylate groups include acrylate and methacrylate of propoxylated bisphenol A divinyl ether, polyethylene glycol di(meth)acrylate, polypropylene glycol di(meth)acrylate, trimethylol ethane tri (meth)acrylate, neopentyl glycol di(meth)acrylate, pentaerythritol tri(meth)acrylate, pentaerythritol tetra(meth) acrylate, di-pentaerythritol hexa(meth)acrylate, hexanediol di(meth)acrylate, tricyclodecane dimethanol diacrylate, tris ((meth)acryloyl oxyethyl) isocyanurate and tris(2-meth) acryloyl oxyethyl) isocyanurate. Either a single compound that contains two or more (meth)acrylate groups or a combination of two or more compounds each of which contains two or more (meth)acrylate groups may be used for the purpose of the present invention. Additionally, a compound that has a polymerizable functional group having a carbon-carbon double bond or carbon-carbon triple bond in the molecule may also be used as a compound having two or more (meth)acrylate groups.

A suitable polymerization initiator can appropriately be selected for the purpose of the present invention depending on the conditions (the wavelength of light to be irradiated, the rate of irradiation, the temperature, etc.) for curing the curable resin. Examples of photopolymerization initiators include alkylphenone photopolymerization initiators, acyl phosphine oxide photopolymerization initiators and titanocene photopolymerization initiators. More specifically, examples of photopolymerization initiators include 2-benzyl-dimethylamino-(4-morpholino phenyl)-1-butanone, 1-hydroxy cyclohexyl phenyl ketone, bis(2,4,6-trimethyl benzoyl)phenyl phosphine oxide and 4-phenyl benzophenone. Specific examples of thermal polymerization initiators include azo compounds such as azo bis-isobutyl nitrile (AIBN) and peroxides such as benzoyl peroxide, tert-butyl peroxy pivalate, tert-butyl peroxy neohexanoate, 1,1-dimethyl butyl peroxy neohexanoate, tert-butyl peroxy neodecanoate, 1,1-demethyl butyl peroxy neodecanoate, cumyl peroxy neohexanoate and cumyl peroxy neodecanoate.

The content ratio of the polymerization initiator in the second resin layer 1 can appropriately be selected depending on the rate of light irradiation or the heating temperature to be used for polymerization. Additionally, the content ratio of the polymerization initiator can be adjusted depending on the target average molecular weight of the polymer to be obtained as a result of polymerization. While the content ratio of the polymerization initiator is variable as a function of the content ratio of the inorganic particles, it is preferably selected from a range between 0.01 parts by mass and 10.00 parts by mass, preferably between 0.05 parts by mass and 5.00 parts by mass, relative to 100 parts by mass of the combination of the curable resin and the dispersion medium. When the content ratio of the polymerization initiator is found within the above cited range, the polymer to be used for the low refractive index and high dispersion layer of a diffractive optical element according to the present invention can satisfactorily be molded and any risk of damaging the appearance and degrading the transparency of a diffractive optical element according to the present invention due to coloring can effectively be avoided. Note that only a single type of polymerization initiator or two or more different types of polymerization initiators can selectively be employed depending on the reactivity of the polymerization initiator or initiators and the organic components of the diffractive optical element, the wavelength of light to be irradiated and the heating temperature.

(Method of Manufacturing Diffractive Optical Element)

The method of manufacturing a diffractive optical element according to the present invention includes: a step of sequentially laying a first resin layer having a diffraction grating and a second resin layer also having a diffraction grating on a substrate; and a step of irradiating the obtained laminate with short wavelength ultraviolet rays at least either from the side of the first resin layer or from the side of the second resin layer to form in the base section of the resin layer on the irradiated side a lower transmittance portion showing an internal transmittance per 50 μm of thickness relative to the wavelength of 400 nm lower than the internal transmittance of the grating section of the resin layer by not less than 2% and not more than 6%.

Now, an embodiment of manufacturing method of the present invention will specifically be described below by referring to FIGS. 4A through 4G. Note, however, that a method of manufacturing a diffractive optical element according to the present invention is not limited to the embodiment that will be described below.

<Formation of Diffraction Grating>

Figure 4A:
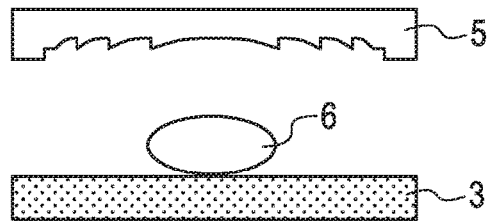
FIGS. 4A, 4B, 4C, 4D, 4E, 4F and 4G are a schematic graphic illustration of an embodiment of method of manufacturing a diffractive optical element according to the present invention.
Figure 4E:
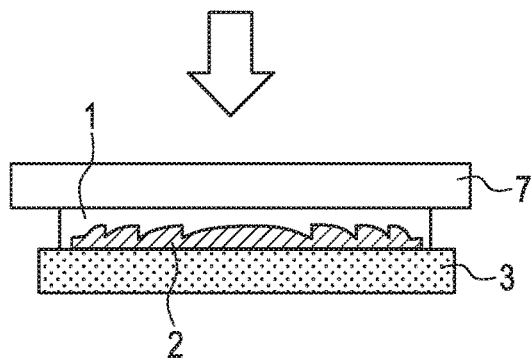
Figure 4B:
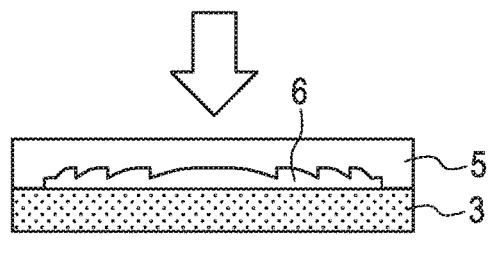
Figure 4F:
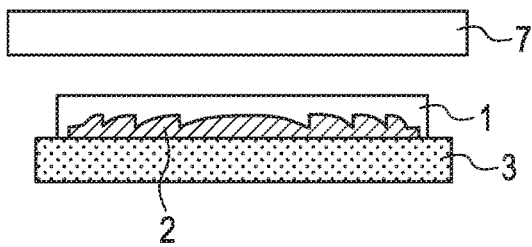
Figure 4C:
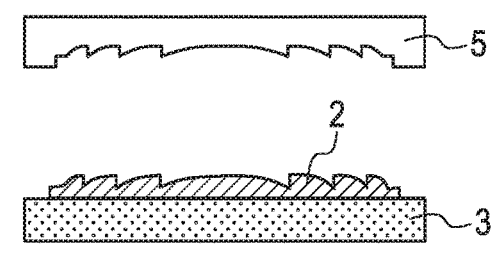

First, an uncured resin material 6 that is to be turned into the first resin layer 2 is filled into the gap between a mold 5 having an arbitrarily selected profile and a substrate 3 (FIGS. 4A and 4B). If necessary, pressure or heat may be applied to the mold 5 and/or the substrate 3 when an uncured resin material 6 is filled into the gap between the mold 5 and the substrate 3. The thickness of the first resin layer 2 can be adjusted by arranging a spacer between the mold and the substrate before an uncured resin material 6 is filled into the gap between the mold 5 and the substrate 3. While the technique to be employed to cure the uncured resin material 6 is not subject to any particular limitations, the resin material 6 can typically be cured by irradiating it with ultraviolet rays or by heating it. After curing the resin material 6, the formed first resin layer 2 is found on the substrate 3 when the mold is released from the cured resin material 6 (FIG. 4C).

Figure 4G:
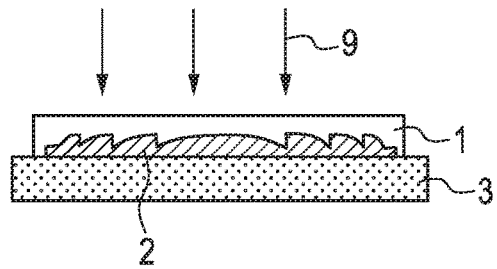
Figure 4D:
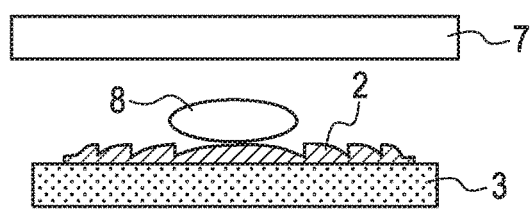

Then, an uncured resin material 8 that is to be turned into the second resin layer 1 is filled into the gap between another mold 7 and the first resin layer 2 having a diffraction grating shape on the surface thereof (FIG. 4D). Subsequently, the resin material 8 is cured (FIG. 4E) and the mold 7 is released from the cured resin material 8 (FIG. 4F) to form the second resin layer 1 on the first resin layer 2. Thus, a diffractive optical element according to the present invention is obtained. While the technique to be employed to cure the uncured resin material 8 is not subject to any particular limitations, it can be cured typically by means of heating or irradiation of ultraviolet rays.

<Preparation of Lower Transmittance Portion>

Now, the method of preparing a lower transmittance portion in the diffractive optical element will be described also by referring to FIGS. 4A through 4G. Note, however, the method to be used to prepare a lower transmittance portion is not limited to the one that will be described below. Ultraviolet rays 9 that have a short wavelength (wavelength not greater than 350 nm) and hence are poorly transmitted through the second resin layer 1, for instance ultraviolet rays 9 having a wavelength of 310 nm, are irradiated onto the second resin layer 1 of the diffractive optical element obtained by means of the above-described method of manufacturing a diffractive optical element from above the second resin layer 1 (FIG. 4G). As a result of irradiating the second resin layer 1 with ultraviolet rays 9 that are poorly transmitted through the second resin layer 1 highly intensely for a long period of time, only the resin material located on and near the surface of the second resin layer 1 becomes tinted yellowish to reduce the transmittance thereof relative to rays of the short wavelength range. Consequently, a lower transmittance portion 4 is obtained in the second resin layer 1. This lower transmittance portion 4 exists only on and near the surface of the second resin layer 1 and does not contain any grating in it. In other words, the transmittance of only the surface and its vicinity of the diffractive optical element that do not contain any grating can continuously be reduced. The film thickness of the lower transmittance portion is preferably not less than 5 μm and not more than 50 μm.

In place of or in addition to the formation of a lower transmittance portion in the second resin layer 1, a lower transmittance portion may be formed in the first resin layer 2 by irradiating the first resin layer 2 with short wavelength ultraviolet rays from the side of the first resin layer 2. While the wavelength and the duration of irradiation of short wavelength ultraviolet rays onto the first resin layer 2 are not subject to any particular limitations, the duration of the UV irradiation can be reduced by using shorter wavelength ultraviolet rays.

(Optical Apparatus)

Figure 5:
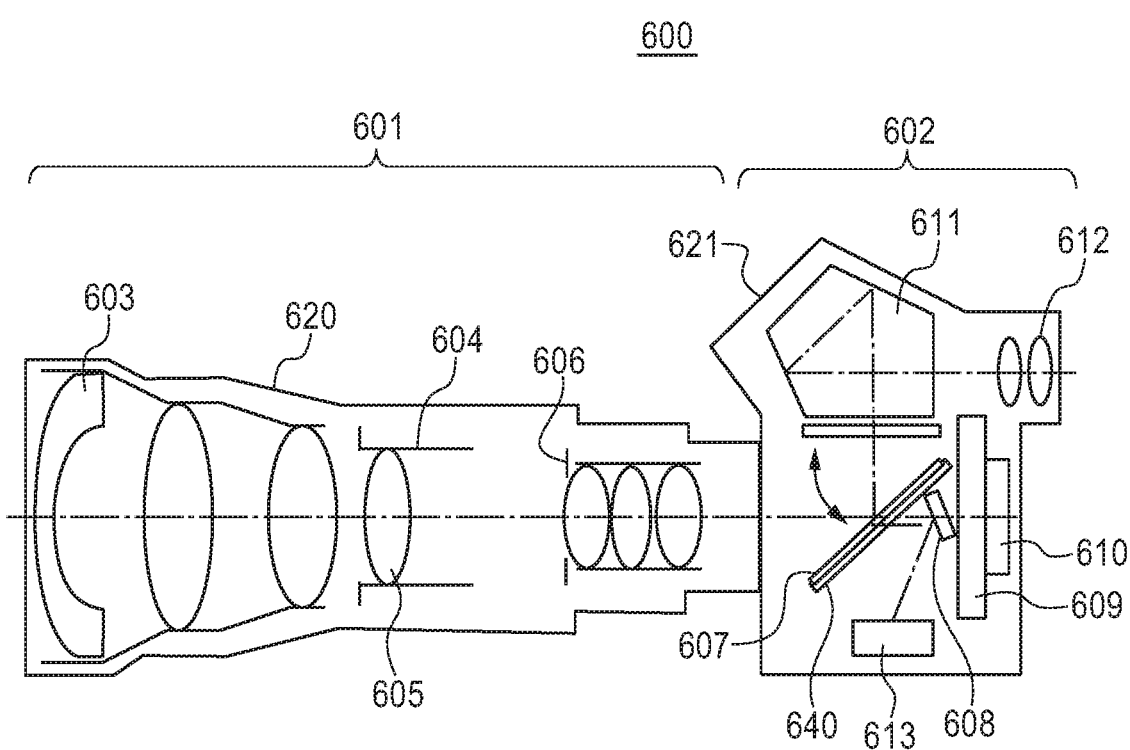
FIG. 5 is a schematic graphic illustration of an embodiment of imaging apparatus according to the present invention.

FIG. 5 is a schematic graphic illustration of the configuration of a highly preferred embodiment of imaging apparatus according to the present invention, which is a single lens reflex digital camera. While a camera body 602 and a lens barrel 601, which is an optical apparatus, of the camera 600 have already been put together in FIG. 5, the lens barrel 601 is in fact an interchangeable lens that is removably attached to the camera body 602.

The rays of light coming from the object to be shot by the camera are picked up by the camera by way of an imaging optical system formed by a plurality of lenses 603, 605 and so on arranged on the optical axis of the imaging optical system so that the object is imaged in the camera. A diffractive optical element according to the present invention can be used for the lens 603 and/or lens 605.

Note here that the lens 605 is supported by inner cylinder 604. More specifically, the lens 605 is supported by the inner cylinder 604 so as to be movable relative to the lens barrel 601 for the purpose of focusing and zooming.

In an observation phase that precedes an actual shooting phase, the rays of light coming from the object are reflected by main mirror 607 in the casing 621 of the camera body and transmitted through a prism 611 so that an image of the object is displayed on the view finder screen of the camera by way of a view finder lens 612 so that the photographer can view the image to be picked up by the camera. The main mirror 607 in the casing is typically a half mirror and the rays of light that are transmitted through the main mirror are reflected by a sub mirror 608 toward the AF (autofocus) unit 613 of the camera. The reflected rays of light may typically be employed for ranging. The main mirror 607 is mounted in and supported by a main mirror holder 640 as it is typically bonded to the main mirror holder 640. In the actual shooting phase, the main mirror 607 and the sub mirror 608 are moved out of the light path in the camera and the shutter 609 is opened by means of a drive mechanism (not shown) to allow the light image coming from the lens barrel 601 to be received and picked up by the image pickup device 610. The aperture 606 of the camera is arranged to make it possible to alter the brightness and the depth of focus for camera shooting by adjusting the area of the aperture.

(Evaluation System)

<Transmittance>

A 50-μm-thick portion from the surface of each of the obtained diffractive optical elements was measured for transmittance in the following manner. First, a sample having a size of several centimeters square and a thickness of several millimeters was cut out from the second resin layer by means of a band saw such that the sample included the surface and a 50-μm thick portion of the second resin layer. Subsequently, the sample was polished by means of automatic polishing equipment until the sample came to show a thickness of 50 μm, leaving the surface unpolished. The obtained sample was then taken out from the holder employed to hold the sample and observed for the transmittance thereof relative to rays of light of 400 nm in wavelength. A spectrophotometer (U4000: trade name, available from Hitachi) was used for the measurement of transmittance.

<Method of Measuring Light Scattering Value of Element>

The scattering value of the element was evaluated by means of an imaging apparatus shown in FIG. 5. More specifically, the diffractive optical element was placed at the position of the lens 605 of the imaging apparatus. The light that entered the diffractive optical element was made visible by the imaging apparatus 610 and the brightness value of the blue component of the light (wavelength range between 430 and 480 nm) was computationally determined at arbitrarily selected four points to obtain a light scattering value.

EXAMPLES

Now, the present invention will be described more specifically below by way of Examples and Comparative Examples. Note here that Examples and Comparative Examples that are described below by no means limit the scope of the present invention.

Example 1

A substance (to be also referred to as ITO-dispersed resin material hereinafter) to be used to form the first resin layer 2 was obtained by dispersing ITO micro particles with an average particle diameter of 20 nm into a UV-curable acrylic resin, which was a mixtures of 20 parts by mass of tris(2-acryloyloxyethyl)isocyanurate, 25 parts by mass of pentaerythritol triacrylate, 40 parts by mass of dicyclopentenyloxyethyl methacrylate, 13 parts by mass of urethane-modified polyester acrylate and 2 parts by mass of 1-hydroxycyclohexyl phenyl ketone.

Then, the material to be used to form the second resin layer 1 was obtained in the following manner. 4.8 parts by mass of ω-carboxy-polycaprolactone monoacrylate (available from Toagosei) was added as dispersant to 100 parts by mass of zirconia-methanol dispersion (SZR-M: trade name, available from Sakai Chemical Industry, average particle diameter of 3 nm in terms of number average, zirconia particle concentration of 30 mass % in the dispersion) and the dispersion was agitated to dissolve the dispersant into the dispersion. A dispersion process was executed on the solution into which the dispersant was dissolved and then dissolved therein were 4.2 parts by mass of tris(2-acryloyloxyethyl)isocyanurate, 2.68 parts by mass of pentaerythritol triacrylate and 8.2 parts by mass of dicyclopentenyloxyethyl acrylate as curable resin and 0.5 parts by mass of 1-hydroxycyclohexyl phenyl ketone as photopolymerization initiator. Thereafter, the solution was vacuum-concentrated at 40° C. in an evaporator, while the solution in the evaporator was heated in an oil bath, to remove methanol and obtain a zirconia-dispersed resin material (to be also referred to as $ZrO_2$-dispersed resin material hereinafter).

Subsequently, the diffractive optical element of this example was obtained by following the sequence of operation graphically illustrated in FIGS. 4A through 4G.

Firstly, the ITO-dispersed resin material 6 was placed on a 2-mm-thick glass substrate 3 and a metal mold 5 for forming a diffractive optical element was arranged on the ITO-dispersed resin material 6 (FIG. 4A). Rays of light were irradiated onto the metal mold 5 from a high pressure mercury lamp (not shown) (EXECURE250 (trade name) available from HOYA CANDEO OPTRONICS) under the conditions of 14.2 mW/cm$^2$ for 211 seconds and 20 mW/cm$^2$ for 600 seconds (with the use of illuminometer: UIT250 (trade name) available from Ushio and receiver: UVD-5365 (trade name) available from Ushio) to cure the ITO-dispersed resin material 6 (FIG. 4B) and thereafter the mold was released from the cured ITO-dispersed resin material 6 (FIG. 4C). Then, the cured ITO-dispersed resin material 6 was annealed at a temperature of 80° C. for 72 hours in the atmosphere to obtain the first resin layer 2 showing a diffraction grating shape of the diffractive optical element of this example.

Next, the $ZrO_2$-dispersed resin material 8 was dropped onto the first resin layer 2 (FIG. 4D) and a flat glass plate 7 was placed on the dropped $ZrO_2$-dispersed resin material 7 to spread and flatten the resin material 8. Then, rays of light were irradiated onto the obtained specimen from a high pressure mercury lamp (not shown) (EXECURE250 (trade name) available from HOYA CANDEO OPTRONICS) under the conditions of 14.2 mW/cm$^2$ for 211 seconds and 20 mW/cm$^2$ for 600 seconds (with the use of illuminometer: UIT250 (trade name) available from Ushio and receiver: UVD-S365 (trade name) available from Ushio) to cure the specimen (FIG. 4E). Thereafter, the flat glass plate 7 was moved away (FIG. 4F) and the specimen was annealed at a temperature of 80° C. for 72 hours. Finally, short wavelength UV rays 9 having a wavelength of 310 nm were irradiated onto the second resin layer 1 to an irradiation dose of 35 J. As a result, the diffractive optical element of this example that had a lower transmittance portion only on the surface of the second resin layer 1 was obtained (FIG. 4G).

Example 2

The zirconia-dispersed resin material and the diffractive optical element using the zirconia-dispersed resin material of this example were obtained under the conditions same as those used for Example 1 except that the irradiation dose of short wavelength UV rays was altered to 30 J in this example.

Example 3

The zirconia-dispersed resin material and the diffractive optical element using the zirconia-dispersed resin material of this example were obtained under the conditions same as those used for Example 1 except that the irradiation dose of short wavelength UV rays was altered to 55 J in this example.

Comparative Example 1

The zirconia-dispersed resin material and the diffractive optical element using the zirconia-dispersed resin material of this comparative example were obtained under the conditions same as those used for Example 1 except that the irradiation dose of short wavelength UV rays was altered to 70 J in this comparative example.

Comparative Example 2

The zirconia-dispersed resin material and the diffractive optical element using the zirconia-dispersed resin material of this comparative example were obtained under the conditions same as those used for Example 1 except that the irradiation dose of short wavelength UV rays was altered to 10 J in this comparative example.

Comparative Example 3

The zirconia-dispersed resin material and the diffractive optical element using the zirconia-dispersed resin material of this comparative example were obtained under the conditions same as those used for Example 1 except that the wavelength of short wavelength UV rays and the irradiation dose of short wavelength UV rays were respectively altered to 365 nm and 60 J in this comparative example.

Table 1 below shows the results of evaluation of the examined physical properties of the cured resin materials and also the results of evaluation of the stacked type diffractive optical elements prepared by using the respective resin materials.

TABLE 1

|  | Example 1 | Example 2 | Example 3 | Comp Ex 1 | Comp Ex 2 | Comp Ex 3 |
| --- | --- | --- | --- | --- | --- | --- |
| Material of 2nd resin layer 1 | $ZrO_2$-dispersed resin material | $ZrO_2$-dispersed resin material | $ZrO_2$-dispersed resin material | $ZrO_2$-dispersed resin material | $ZrO_2$-dispersed resin material | $ZrO_2$-dispersed resin material |

TABLE 1-continued

|  | Example 1 | Example 2 | Example 3 | Comp Ex 1 | Comp Ex 2 | Comp Ex 3 |
|---|---|---|---|---|---|---|
| Refractive index of 2nd resin layer 1 (nd) | 1.62 | 1.62 | 1.62 | 1.62 | 1.62 | 1.62 |
| Abbe number of 2nd resin layer 1 (vd) | 43.8 | 43.8 | 43.8 | 43.8 | 43.8 | 43.8 |
| Material of 1st resin layer 2 | ITO-dispersed resin material | ITO-dispersed resin material | ITO-dispersed resin material | ITO-dispersed resin material | ITO-dispersed resin material | ITO-dispersed resin material |
| Refractive index of 1st resin layer 2 (nd) | 1.57 | 1.57 | 1.57 | 1.57 | 1.57 | 1.57 |
| Abbe number of 1st resin layer 2 (vd) | 19.5 | 19.5 | 19.5 | 19.5 | 19.5 | 19.5 |
| Wavelength of irradiated UV rays (nm) | 310 | 310 | 310 | 310 | 310 | 365 |
| UV rays irradiation does [J] | 35 | 30 | 55 | 70 | 10 | 60 |
| Transmittance of 2nd resin layer 1 in terms 50 nm [%] | 98.1 | 98.1 | 98.1 | 98.1 | 98.1 | 98.1 |
| Transmittance of surface of 2nd resin layer 1 including lower transmittance portion in terms of 50 nm [%] | 95.1 | 95.7 | 92.3 | 91.9 | 97.3 | 95.1 |
| Decrease of transmittance of surface of 2nd resin layer 1 in terms of 50 nm [%] | 3.0 | 2.4 | 5.8 | 6.2 | 0.8 | 3.0 |
| Film thickness of lower transmittance portion [μm] | 23 | 18 | 30 | 45 | 4 | 60 |
| Location of lower transmittance portion | Surface of 2nd resin layer | Surface of 2nd resin layer | Surface of 2nd resin layer | Surface of 2nd resin layer | Surface of 2nd resin layer | Reached to grating |
| Composition of material of lower transmittance portion | Same as that of 2nd resin layer | Same as that of 2nd resin layer | Same as that of 2nd resin layer | Same as that of 2nd resin layer | Same as that of 2nd resin layer | Same as that of 2nd resin layer |
| Scattering value of device | 41 | 42 | 38 | 44 | 46 | 40 |
| Additional problem | — | — | — | — | — | Worsened phase shift of transmitted wave front |
| Evaluation | A | A | A | B | B | B |

The evaluation indexes A and B in Table 1 have the following meanings.
A: The scattering value of the device was less than 43 and no additional problem arose.
B: The scattering value of the device was not less than 43 or one or more additional problems arose.

As seen from Table 1, in each of Examples 1 through 3, the scattering value of the diffractive optical element could be improved by irradiating short wavelength ultraviolet rays onto the second resin layer 1, thereby continuously reducing the transmittance in the short wavelength range only on the surface of the second resin layer 1. When the irradiation dose was excessively increased as in Comparative Example 1, the transmittance fell over the entire visible light wavelength range to consequently degrade the performance of the diffractive optical element. When, on the other hand, the irradiation dose was excessively decreased as in Comparative Example 2, the transmittance reducing effect in the lower transmittance portion became unsatisfactory and consequently the scattering value could not be minimized. When, finally, relatively long wavelength UV rays were irradiated as in Comparative Example 3, the lower transmittance portion got to the grating section to reduce the transmittance in the inside of the second resin layer 1 so that consequently the optical performance of the diffractive optical element was degraded.

As described above, according to the present invention, the transmittance of only the surface and its vicinity that do not include the grating section of a diffractive optical element according to the present invention can continuously be reduced in the direction of the optical axis. As a result of the formation of a lower transmittance portion, the rate at which light in the short wavelength range that enters the element can be reduced to minimize the adverse effect of scattering of light in the short wavelength range. Thus, the present invention can provide a diffractive optical element whose optical performance including the diffraction efficiency is not degraded at all.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-070127, filed Apr. 1, 2019, which is hereby incorporated by reference herein in its entirety.

What is claimed is:

1. A diffractive optical element comprising:
a substrate;
a first resin layer arranged on the substrate; and
a second resin layer arranged on the first resin layer,
wherein the first resin layer includes a base section of the first resin layer and a grating section of the first resin layer, the base section of the first resin layer being arranged on the grating section of the first resin layer,
wherein the second resin layer includes a base section of the second resin layer and a grating section of the second resin layer, the base section of the second resin layer being arranged on the grating section of the second resin layer,
wherein an interface of the grating section of the first resin layer and the grating section of the second resin layer forms a diffraction grating, and
wherein the base section of at least one of the first resin layer or the second resin layer has a lower transmittance portion showing an internal transmittance per 50 μm of thickness relative to the wavelength of 400 nm lower than the grating section of the at least one of the first resin layer or the second resin layer by not less than 2% and not more than 6%.

2. The diffractive optical element according to claim 1, wherein the lower transmittance portion is formed by the same resin material as the resin material that constitutes the base section.

3. The diffractive optical element according to claim 1, wherein the lower transmittance portion shows a transmittance that continuously varies.

4. The diffractive optical element according to claim 1, wherein the lower transmittance portion has a film thickness of not less than 5 µm and not greater than 50 µm.

5. The diffractive optical element according to claim 1, wherein the lower transmittance portion is formed on the surface of the second resin layer that is not held in contact with the first resin layer.

6. The diffractive optical element according to claim 1, wherein the first resin layer and the second resin layer are each formed by a UV-curable resin.

7. The diffractive optical element according to claim 1, wherein a second substrate is arranged on the second resin layer.

8. The diffractive optical element according to claim 1, wherein both the relationship requirement of nd1<nd2 and the relationship requirement of v1<v2 are satisfied,
where
nd1 is the refractive index of the first resin layer;
v1 is the Abbe number of the first resin layer;
nd2 is the refractive index of the second resin layer; and
v2 is the Abbe number of the second resin layer.

9. An optical apparatus comprising:
a casing; and
an optical system arranged in the casing and formed by a plurality of lenses,
wherein at least one of the lenses is a diffractive optical element according to claim 1.

10. An imaging apparatus comprising:
a casing;
an optical system arranged in the casing and formed by a plurality of lenses; and
an image pickup device for receiving the rays of light transmitted through the optical system,
wherein at least one of the lenses is a diffractive optical element according to claim 1.

11. The imaging apparatus according to claim 10, which is a camera.

* * * * *